United States Patent
Alfano et al.

(10) Patent No.: US 6,259,175 B1
(45) Date of Patent: Jul. 10, 2001

(54) LINEAR ACTUATOR

(75) Inventors: Don C. Alfano, Roscoe; Ronald D. Andrews, Marengo; Joel M. Hallet, Roscoe, all of IL (US); Samuel O. Newport, Green Valley, AZ (US); Larry E. Plunkett, Vernon, IL (US); William L. Sharp, Poplar Grove, IL (US); Charles H. Thompson, Stillman Valley, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/443,235

(22) Filed: Nov. 18, 1999

(51) Int. Cl.[7] .................................................. H02K 7/06
(52) U.S. Cl. ............................................ 310/20; 310/47
(58) Field of Search ................................ 310/12, 13, 14, 310/20, 80, 47; 74/89.15

(56) References Cited

U.S. PATENT DOCUMENTS

| | | | |
|---|---|---|---|
| 3,951,004 | 4/1976 | Heesch | 74/89.15 |
| 4,241,814 | 12/1980 | Masclet | 74/89.15 X |
| 4,318,304 | 3/1982 | Lang | 74/89.15 |
| 4,602,520 | 7/1986 | Nishikawa et al. | 74/89.15 X |
| 4,669,325 | 6/1987 | Nishikawa et al. | 74/89.15 |
| 4,679,457 | 7/1987 | Nishikawa et al. | 74/89.15 X |
| 4,790,201 | 12/1988 | Gheddo | 74/89.15 |
| 4,858,481 | 8/1989 | Abraham | 74/89.15 |
| 5,090,513 | 2/1992 | Bussinger | 74/89.15 X |
| 5,388,471 | 2/1995 | DeCampos et al. | 74/89.15 |
| 5,461,935 | 10/1995 | Hill | 74/89.15 X |
| 5,620,078 | 4/1997 | Nakamura et al. | 310/13 X |
| 5,655,636 | 8/1997 | Lang et al. | 74/89.15 X |
| 5,809,833 | 9/1998 | Newport et al. | 74/89.15 |
| 6,100,609 | * 8/2000 | Weber | 310/12 |

* cited by examiner

Primary Examiner—Nestor Ramirez
Assistant Examiner—Judson H. Jones
(74) Attorney, Agent, or Firm—MacMillan, Sobanski & Todd, LLC

(57) ABSTRACT

A linear actuator includes a hollow housing that is formed from a first portion and a second portion. The first portion of the housing is formed to support all of the components of the linear actuator therein, while the second portion of the housing functions to retain such components in the first portion of the housing. An end cap is secured to the end of the elongated tube portion to close the housing. The linear actuator includes a motor that operates through a clutch assembly to selectively rotate a screw. The clutch assembly limits the amount of torque that can be transmitted from the motor to the screw assembly. A nut is mounted on the screw assembly for linear movement in response to rotation of the screw assembly. An extension tube is crimped onto the nut for effecting linear movement of a workpiece. The structure of the nut is designed to facilitate an improved crimping connection between the nut and the extension tube. A dynamic braking circuit is provided to minimize coasting movement of the nut and the extension tube after motor has been turned off.

16 Claims, 8 Drawing Sheets

LINEAR ACTUATOR

BACKGROUND OF THE INVENTION

This invention relates in general to linear actuators that are adapted to cause linear reciprocating movement of a workpiece along a desired path. In particular, this invention relates to an improved structure for such a linear actuator that is relatively compact in size, inexpensive in construction, and yet which is capable of handling relatively heavy loads.

A linear actuator is a device which is used to cause linear movement, typically reciprocating linear movement, of a workpiece along a desired path of movement. A typical linear actuator includes an electric motor having a rotatable output shaft. The output shaft of the electric motor is connected through a gear train to a nut and lead screw mechanism. Rotation of the output shaft of the electric motor causes corresponding rotation of the lead screw. The nut has an opening formed therethrough having an internal thread. The lead screw extends through the opening and has an external thread formed which cooperates with the internal thread formed on the nut. The nut is mounted on the lead screw in such a manner as to be restrained from rotating with the lead screw when the lead screw rotates. As a result, rotation of the lead screw causes linear movement of the nut axially along the lead screw. The direction of such axial movement of the nut (and the workpiece connected thereto) is dependent upon the direction of rotation of the lead screw.

Linear actuators are widely used in a variety of applications ranging from small to heavy loads. To accommodate heavy loads, known linear actuator structures have been formed from relatively large and heavy metallic components. Consequently, linear actuator structures currently in use are relatively heavy and expensive. Thus, it would be desirable to provide an improved linear actuator structure which is relatively lightweight and inexpensive to produce, and yet which is capable of handling heavy loads.

SUMMARY OF THE INVENTION

This invention relates to an improved structure for a linear actuator including a hollow housing that protectively encloses most of the components thereof to prevent the entry of dirt, water, and other contaminants from the environment. The housing of the linear actuator is formed from a first portion and a second portion that are secured together to form a hollow enclosure. The mating edges of the first and second portions of the housing can be formed in having a conventional tongue-and-groove structure and is preferably sealed to prevent the entry of dirt, water, and other contaminants within the housing. The first and second portions of the housing may initially be formed having an elongated tube portion of predetermined length. Depending upon the specific application for the linear actuator, the first and second portions can be cut to desired shorter lengths prior to assembly of the various components of the linear actuator. The first portion of the housing is formed to support all of the components of the linear actuator therein, while the second portion of the housing functions to retain such components in the first portion of the housing. After the assembly of the first and second portions of the housing, an end cap is secured to the end of the elongated tube portion to close the housing. The linear actuator includes a motor that operates through a clutch assembly to selectively rotate a screw. The clutch assembly limits the amount of torque that can be transmitted from the motor to the screw assembly. A nut is mounted on the screw assembly for linear movement in response to rotation of the screw assembly. An extension tube is crimped onto the nut for effecting linear movement of a workpiece. The structure of the nut is designed to facilitate an improved crimping connection between the nut and the extension tube. A dynamic braking circuit is provided to minimize coasting movement of the nut and the extension tube after motor has been turned off.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
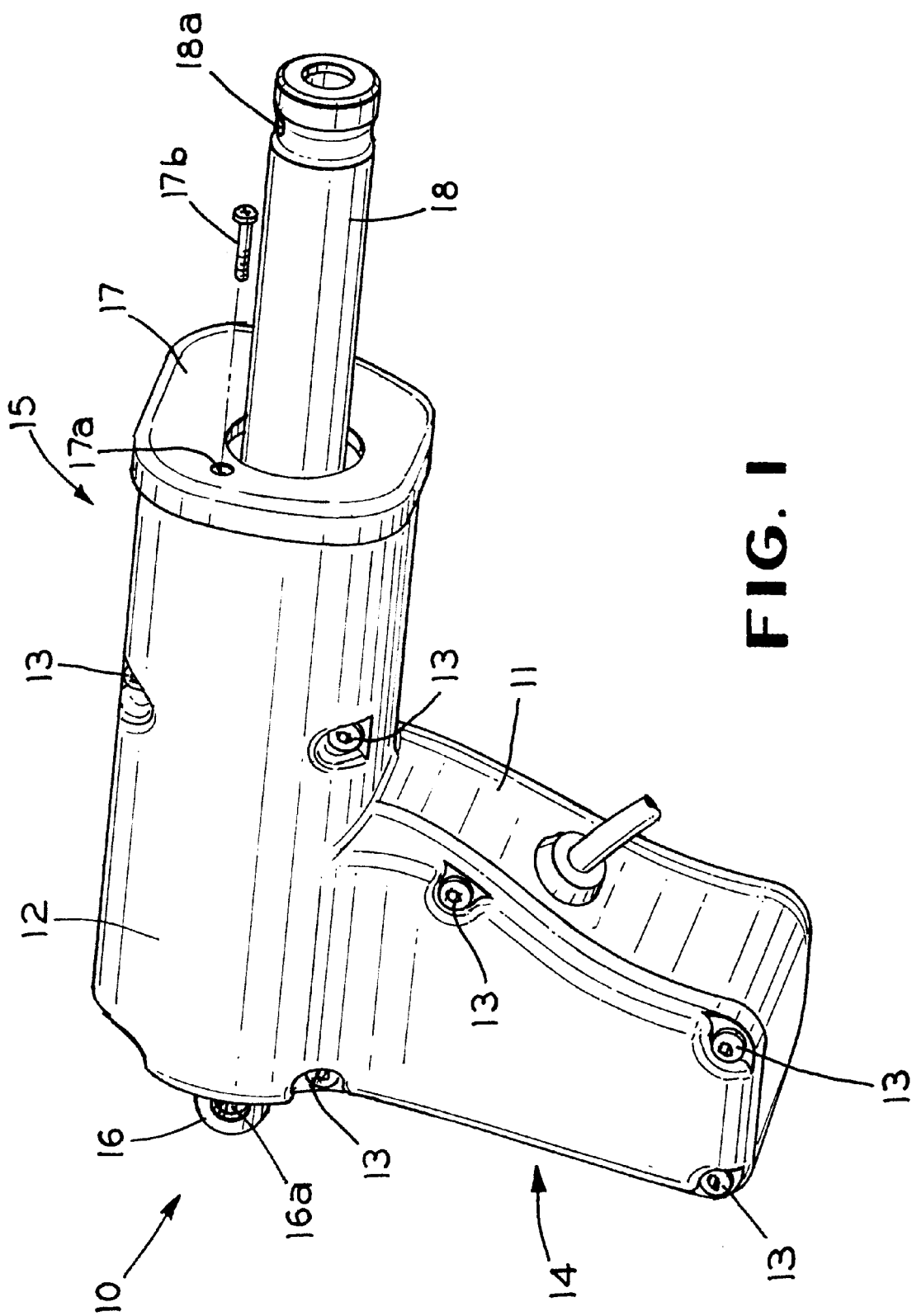
FIG. 1 is a perspective view of the exterior of a linear actuator in accordance with this invention.

Referring now to the drawings, there is illustrated in FIG. 1 a linear actuator, indicated generally at 10, in accordance with this invention. The linear actuator 10 includes a hollow housing that protectively encloses most of the components thereof to prevent the entry of dirt, water, and other contaminants from the environment. As will be explained in greater detail below, the housing of the linear actuator 10 is formed from a first portion 11 and a second portion 12 that are secured together, such as by a plurality of threaded fasteners 13, to form a hollow enclosure. The mating edges of the first and second portions 11 and 12 of the housing can be formed in having a conventional tongue-and-groove structure and is preferably sealed to prevent the entry of dirt, water, and other contaminants within the housing. The housing includes a body portion, indicated generally at 14, and an elongated tube portion, indicated generally at 15. As will be explained in greater detail below, most of the internal components of the linear actuator 10 are enclosed within the body portion 14. A first mounting structure 16 is secured to the body portion 14 of the linear actuator. The first mounting structure 16 is conventional in the art and has a mounting bore 16a formed therethrough that is provided to facilitate the connection of the linear actuator 10 to a support structure. However, any other suitable mounting configuration may be used for this purpose. The end of the elongated tube portion 15 of the housing is closed by an end cap 17, the structure of which will be described in detail below. An extension tube 18 extends through the elongated tube portion 15 of the housing and outwardly from the linear actuator 10 through the end cap 17. An aperture 18a is formed through the end of the extension tube 18 to facilitate the connection of the linear actuator 10 to a workpiece to be moved. However, any other suitable mounting configuration may be provided for this purpose. The end cap 17 can include an annular seal (not shown) for preventing dirt, water, and other contaminants from entering into the housing for the linear actuator 10 through the aperture 18a.

Preferably, the first and second portions 11 and 12 of the housing are initially formed such that the elongated tube portion 15 has a predetermined length. Depending upon the specific application for the linear actuator 10, it may be desirable to shorten the overall length of the elongated tube portion 15. To accomplish this, the first and second portions 11 and 12 can be cut to desired shorter lengths prior to assembly of the various components of the linear actuator 10, as described in detail below. After such assembly, the end cap 17 can then be secured to the end of the elongated tube portion 15 in the manner described below to close the housing.

Figure 2:
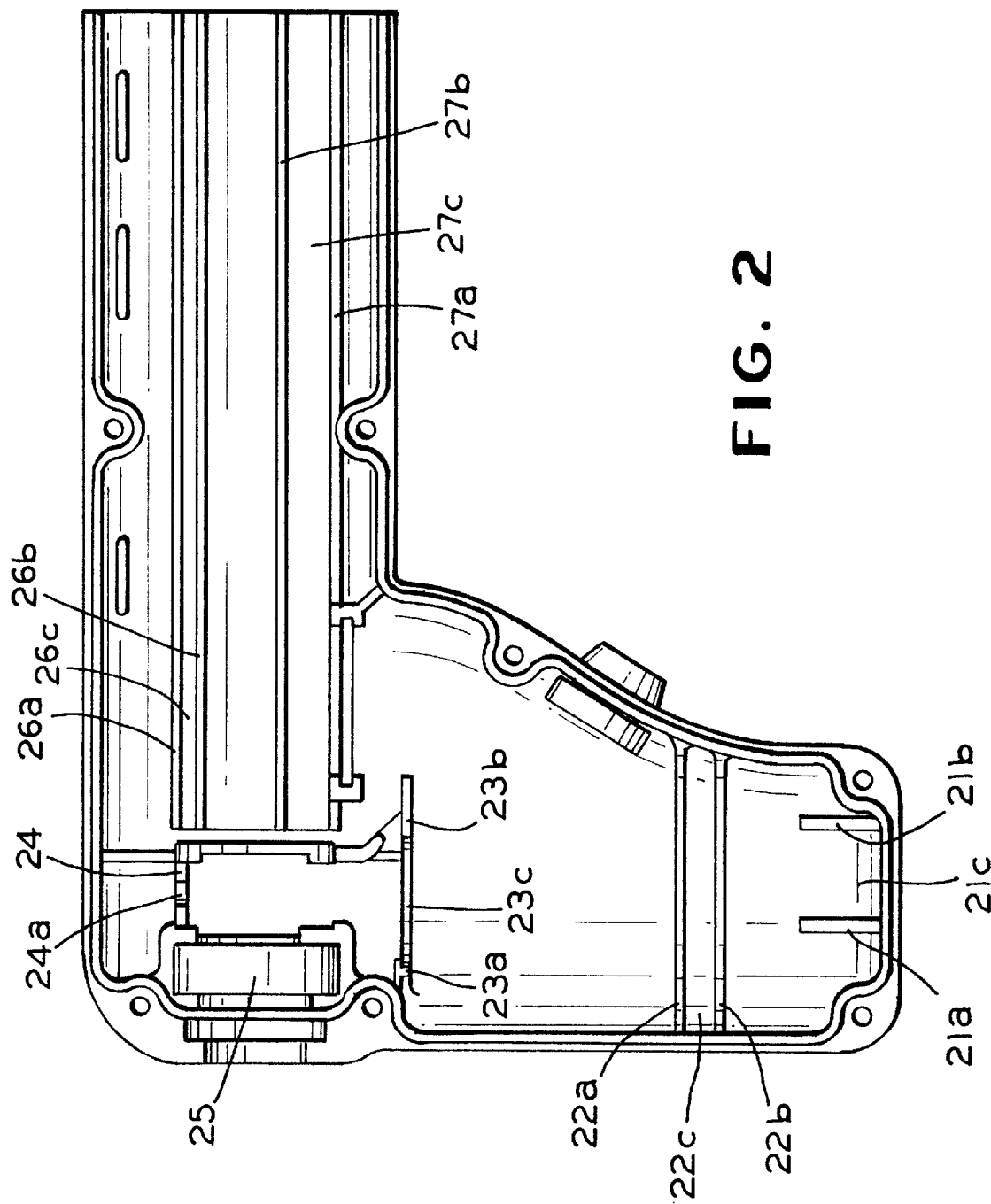
FIG. 2 is a top plan view of the first portion of the housing for the linear actuator illustrated in FIG. 1.

Referring now to FIG. 2, the structure of the first portion 11 of the housing for the linear actuator 10 is illustrated in detail. As shown therein, the first portion 11 of the housing includes a first pair of opposed internal walls 21a and 21b formed in the body portion 14 thereof. The first pair of opposed internal walls 21a and 21b define a first recess 21c therebetween, the purpose of which will be explained below. Similarly, the first portion 11 of the housing includes a second pair of opposed internal walls 22a and 22b formed in the body portion 14 thereof. The second pair of opposed internal walls 22a and 22b define a second recess 22c therebetween, the purpose of which will be also explained below. The first portion 11 of the housing further includes a third pair of opposed internal walls 23a and 23b formed in the body portion 14 thereof. A concave curved support surface 23c extends between the third pair of opposed internal walls 23a and 23b. Additionally, the first portion 11 of the housing includes an internal wall 24 having a concave support surface 24a formed therein. Lastly, the first portion 11 of the housing additionally includes a concave recessed support surface 25 formed therein. The purposes for the support surface 23c between the third pair of opposed internal walls, the concave support surface 24a formed in the internal wall 24, and the concave recessed support surface 25 will be explained below.

The first portion 11 of the housing also includes a fourth pair of opposed internal walls 26a and 26b formed in the elongated tube portion 15 thereof. The fourth pair of opposed internal walls 26a and 26b define a fourth recess 26c therebetween, the purpose of which will be explained below. Similarly, the first portion 11 of the housing further includes a fifth pair of opposed internal walls 27a and 27b formed in the elongated tube portion 15 thereof. The fifth pair of opposed internal walls 27a and 27b define a fifth recess 27c therebetween, the purpose of which will be also explained below.

Figure 3:
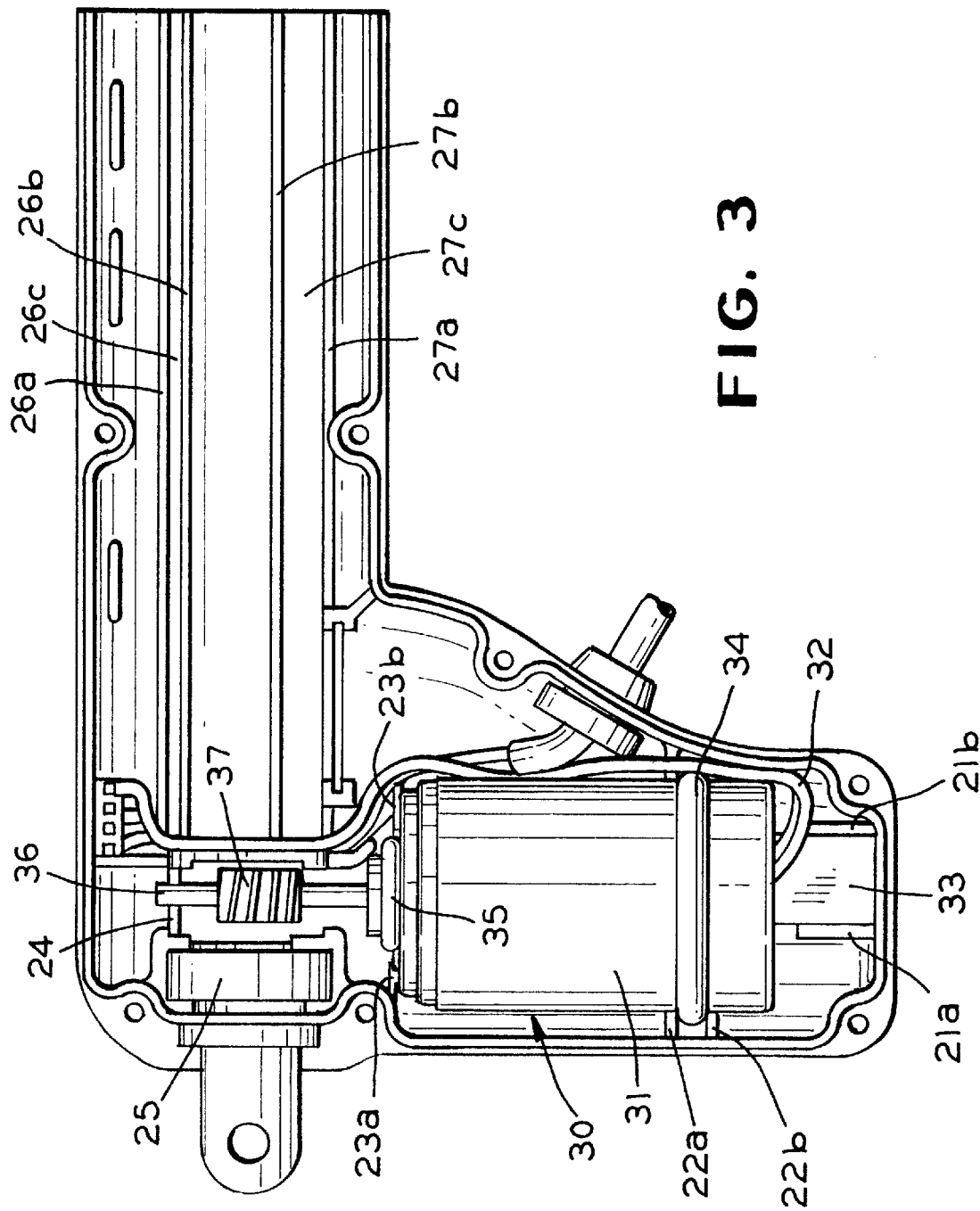
FIG. 3 is a top plan view similar to FIG. 2 showing an electric motor assembly supported on the first portion of the housing for the linear actuator.

Referring now to FIG. 3, the first portion 11 of the housing for the linear actuator 10 is shown in a partially assembled condition with an electric motor assembly, indicated generally at 30. The electric motor assembly 30 is generally conventional in the art and includes a bidirectional electric motor 31 or other source of rotational power having a plurality of electrical conductors 32 extending therefrom. The electrical conductors 32 are provided to connect the electric motor 31 through a control circuit to a source of electrical energy, as discussed in detail below. A first vibration dampening isolator 33 is secured to a first end of the electric motor 31 and is received in and supported by the first recess 21c defined between the first pair of opposed internal walls 21a and 21b formed in the first portion 11 of the housing. The first vibration dampening isolator 33 is preferably formed from an elastomeric material, such as rubber. Similarly, a second vibration dampening isolator 34 extends about the body of the electric motor 31 and is received in and supported by the second recess 22c defined between the second pair of opposed internal walls 22a and 22b. The second vibration dampening isolator 34 is preferably formed as an O-ring of an elastomeric material, such as rubber.

Additionally, a third vibration dampening isolator 35 extends about a portion of a second end of the electric motor 31 and is received in and supported by the concave curved support surface 23c extending between the third pair of opposed internal walls 23a and 23b. The third vibration dampening isolator 34 is also preferably formed as an O-ring of an elastomeric material, such as rubber. The electric motor 31 includes an output shaft 36 that is received in and supported by the concave support surface 24a formed in the internal wall 24 of the first portion 11 of the housing for the linear actuator 10. A worm gear 37 is mounted on the output shaft 36 for rotation therewith. The purpose for the worm gear 37 will be explained below.

Figure 4:
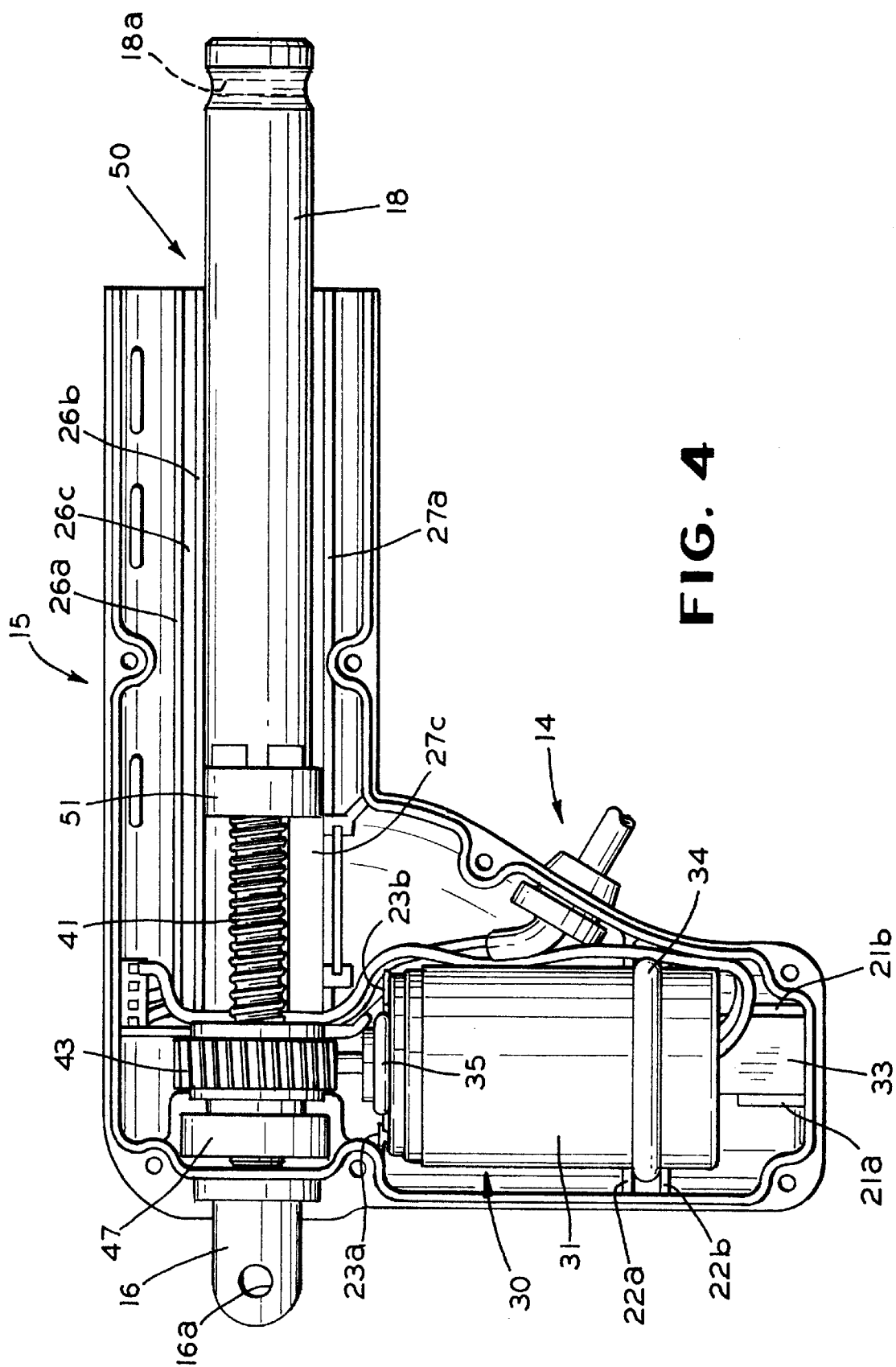
FIG. 4 is a top plan view similar to FIG. 3 showing a screw assembly supported on the first portion of the housing for the linear actuator.
Figure 5:
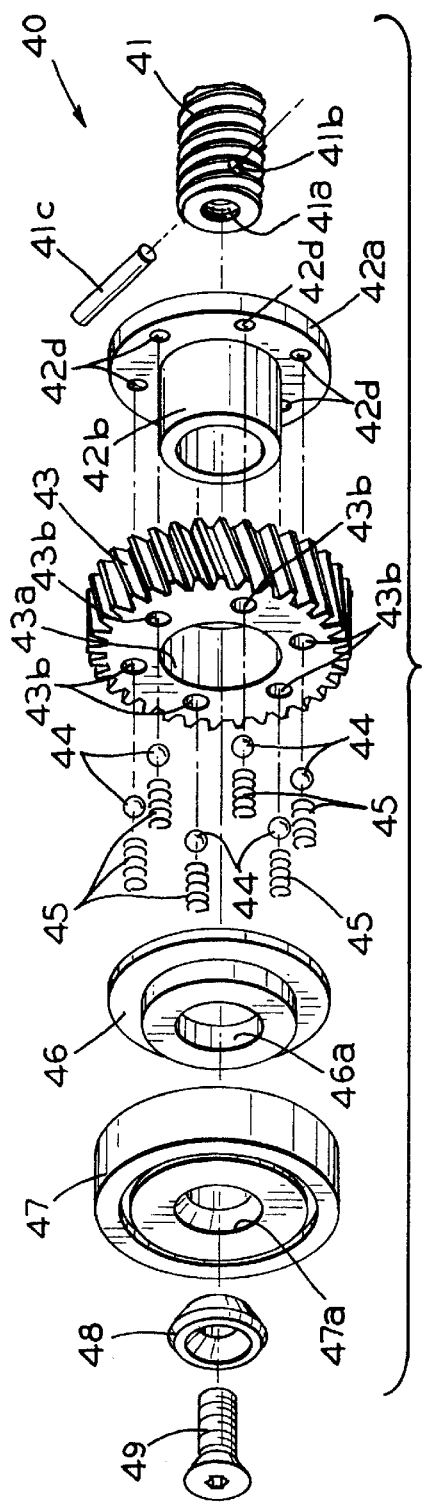
FIG. 5 is an enlarged exploded perspective view of a first portion of the screw assembly shown in FIG. 4.

Referring now to FIG. 4, the first portion 11 of the housing for the linear actuator 10 is shown in a further partially assembled condition with a screw assembly, indicated generally at 40. The structure of a first portion of the screw assembly 40 is shown in greater detail in FIG. 5. As shown therein, the screw assembly 40 includes an elongated threaded screw 41 having a threaded opening 41a formed in one end thereof. Also, a transverse aperture 41b is formed through the threaded screw 41 near the one end thereof The screw assembly 40 also includes a hub, indicated generally at 42. The hub 42 is generally hollow and cylindrical in shape and includes an enlarged flange portion 42a and a central body portion 42b extending from the flange portion 42a. An opening 42c is formed through the hub 42 from the flange portion 42a to the central body portion 42b. The end of the screw 41 extends completely through the opening 42c.

The hub 42 is connected to the screw 41 for rotation therewith. To accomplish this, a second recess (not shown) is also formed in the first face of the flange portion 42a of the hub 42. The second recess is preferably semi-cylindrical in shape and extends transversely relative to the axially extending cylindrical recess. To connect the hub 42 to the screw 41 for concurrent rotation, a pin 41c is initially inserted through the transverse aperture 41b formed through the screw 41. The length of the pin 41c is selected to be somewhat larger than the diameter of the screw 41. As a result, the ends of the pin 41c extend outwardly on opposite sides of the screw 41. Then, the end of the screw 41 is inserted within the cylindrical recess formed in the hub 42 such that the protruding ends of the pin 41c are received within the semi-cylindrical recess formed in the first face of the flange portion 42a of the hub 42. The cooperation of the ends of the pin 41c with the semi-cylindrical recess provides a rotational driving connection between the hub 42 and the screw 41. The cooperation of the ends of the pin 41c with the semi-cylindrical recess also resolves axial thrust forces between the hub 42 and the screw 41. The hub 42 has at least one recess 42d (and preferably a plurality of recesses 42d) formed in a second face of the flange portion 42a. The recesses 42d are preferably semi-spherical in shape and are provided for a purpose that will be explained below.

The screw assembly 40 further includes a toothed gear 43 having a relatively large central aperture 43a formed therethrough. The central aperture 43a is preferably sized to be only slightly larger than the central body portion 42b of the hub 42. As a result, the toothed gear 43 can be installed upon and rotatably supported by the central body portion 42b of the hub 42. A plurality of relatively small peripheral apertures 43b are also formed through the toothed gear 43 about the central aperture 43a thereof. The peripheral apertures 43b preferably correspond in size and are axially aligned with the recesses 42d formed in the second face of the flange portion 42a of the hub 42. A ball bearing 44 is provided for and disposed within each of the peripheral apertures 43b. The ball bearings 44 are preferably sized to be slightly smaller than the inner diameters of the peripheral apertures 43b to allow for free axial movement therein, while limiting the amount of radial play therebetween. A coiled spring 45 or other resilient mechanism is also provided for and disposed within each of the peripheral apertures 43b.

In a manner that is described in detail below, a first face of a retainer plate 46 is maintained against the toothed gear 43 to retain the springs 45 and the ball bearings 44 within the associated peripheral apertures 43b formed through the toothed gear 43. As a result, the springs 45 urge the ball bearings 44 into the recesses 42d formed in the second face of the flange portion 42a of the hub 42. The ball bearings 44 are sized such that first semi-spherical portions thereof are received within the recesses 42d, while second semi-spherical portions thereof remain within the peripheral apertures 43b of the toothed gear 43. This cooperation between the toothed gear 43, the ball bearings 44, and the recesses 42d formed in the second face of the flange portion 42a of the hub 42 provides a rotational driving connection between the toothed gear 43 and the hub 42 (and, therefore, the screw 41). If desired, the peripheral apertures 43b can extend only partially within the toothed gear 43, as opposed to extending completely therethrough as illustrated.

However, the amount of torque that can be transmitted from the toothed gear 43 to the hub 42 is limited by the force generated by the springs 45 and, to a certain extent, the relative sizes of the ball bearings 44 and the recesses 42d. If the amount of torque desired to be transmitted exceeds a predetermined maximum value, the ball bearings 44 will be moved out of the recesses 42d against the urging of the springs 45 and back within the peripheral apertures 43b of the toothed gear 43. In the illustrated embodiment, six ball bearings 44 are urged into engagement with a corresponding number of recesses 42d by respective springs 45. However, it will be appreciated that this invention may be practiced with any desired number of such ball bearing 44 and spring 45 assemblies. Indeed, by adjusting the number of such ball bearing 44 and spring 45 assemblies, the predetermined maximum value of torque that can be transmitted from the toothed gear 43 to the hub 42 can be adjusted as desired. Additionally, the sizes of the springs 45 can be varied to adjust the predetermined maximum value of torque as desired.

The retainer plate 46 has an enlarged central opening 46a formed therethrough. The central aperture 46a is preferably sized to be only slightly larger than the central body portion 42b of the hub 42. As a result, the retainer plate can be installed upon and rotatably supported by the central body portion 42b of the hub 42. Preferably, one or more protrusions (not shown) are formed on the first face of retainer plate 46. The protrusions are sized to extend partially within one or more of the peripheral apertures 43b formed through the toothed gear 43. As a result, the retainer plate 46 is connected to the toothed gear 43 for rotation therewith relative to the hub 42.

The screw assembly 40 further includes an annular bearing 47 having a central opening 47a formed therethrough. The bearing 47 is conventional in the art and includes an inner race that is rotatably supported within an outer race. The central opening 47a is formed through the inner race of the bearing 47 and is sized to receive the end of the screw 41 therein. As a result, the end of the screw 41 is rotatably supported in the inner race of the bearing 47. The bearing 47 is secured to the remainder of the screw assembly 40 by means of a tapered alignment washer 48 and a threaded fastener 49. The threaded fastener 49 extends through the alignment washer 48 into threaded engagement with the threaded opening 41a formed in the end of the screw 41. To assemble the screw assembly 40, the threaded fastener 49 is tightened, thereby drawing the alignment washer 48, the bearing 47, the retainer plate 46 and the toothed gear 43 into engagement with the flange portion 42a of the hub 42.

The screw assembly 40 further includes an extension tube assembly, indicated generally at 50 in FIG. 4. As shown therein, the extension tube assembly 50 includes a nut 51 having a threaded central aperture (not shown) formed therethrough. The threaded central aperture of the nut 51 cooperates with the threaded outer surface of the screw 41. The nut 51 further includes an anti-rotation arm 51a that is sized and shaped to be received within the fifth recess 27c defined between the fifth internal walls 27a and 27b formed in the first portion 11 of the housing for the linear actuator 10. Consequently, the nut 51 is restrained from rotation relative to the first portion 11 of the housing for the linear actuator 10. Thus, when the screw 41 is rotated by the electric motor 31, the nut 51 is caused to move linearly throughout the elongated tube portion 15 of the linear actuator 10. The direction of such linear movement is dependent upon the direction of rotation of the toothed gear 43.

Figure 6:
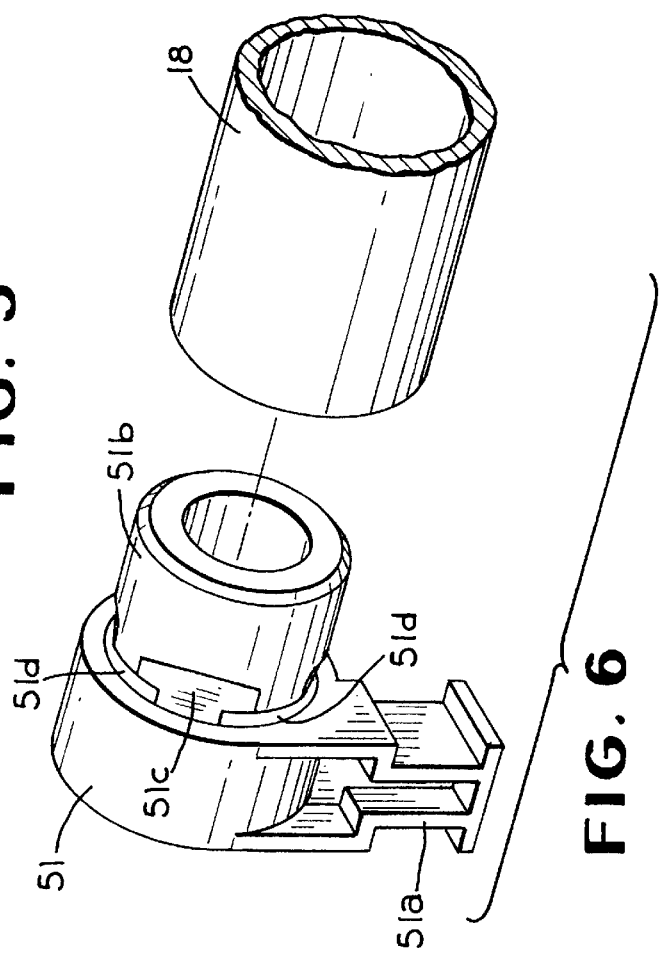
FIG. 6 is an enlarged exploded perspective view of a second portion of the screw assembly shown in FIG. 4.

A generally hollow cylindrical extension tube 18 is connected to the nut 51 for linear movement therewith. As best shown in FIG. 6, the nut 51 further includes a generally cylindrical mounting hub 51b defining an outer diameter that is slightly larger than the inner diameter of the extension tube 18. Thus, the extension tube 18 can be press fit over the mounting hub 51b of the nut 51. A plurality of flats 51c (only one is illustrated in FIG. 6) is formed on the mounting hub 51b. Additionally, a generally annular reduced diameter recess 51d is formed on the mounting hub 51b. When the extension tube 18 is installed on the mounting hub 51b of the nut 51, the end portion of the extension tube 18 extends over both the flats 51c and the recess 51d. The end portion of the extension tube 18 extends is then crimped by a conventional crimping apparatus, as shown in FIG. 4, such that portions of the extension tube 18 are deformed radially inwardly into engagement with both the flats 51c and the recess 51d. As a result, the extension tube 18 is securely connected with the nut 51 to prevent both relative rotational movement (by virtue of the engagement with the flats 51c) and relative axial movement (by virtue of the engagement with the recess 51d).

When the screw assembly 40 has been assembled in this manner, it can be assembled as a unit in the first portion 11 of the housing for the linear bearing 10. To accomplish this, the bearing 47 is disposed in the concave recessed support surface 25 formed in the first portion 11 of the housing. When this is done, the toothed gear 43 meshes with the worm gear 37 provided on the output shaft 36 of the electric motor 31. Consequently, when the electric motor 31 is operated to rotate the worm gear 37, the toothed gear 43 is rotated as well. The direction of rotation of the toothed member 43 is dependent upon the direction of rotation of the worm gear 37. As discussed above, the toothed gear 43 is connected to rotatably drive the screw 41 through the load limiting clutch formed by the hub 42, the toothed gear 43, the ball bearings 44, the springs 45, and the retainer plate 46. As mentioned above, the nut 51 is threaded onto the screw 41, but is restrained from rotation by virtue of the cooperation of the anti-rotation arm 51a with the fifth recess 27c defined between the fifth internal walls 27a and 27b formed in the first portion 11 of the housing for the linear actuator 10.

Consequently, the nut 51 and the extension tube 18 are moved linearly when the screw 41 is rotated.

As mentioned above, the first portion 11 of the housing includes a fourth pair of opposed internal walls 26a and 26b formed in the elongated tube portion 15 thereof and that define a fourth recess 26c therebetween. A similar pair of opposed internal walls (not shown) are formed in the elongated tube portion 15 of the second portion 12 of the housing. This other pair of opposed internal walls define a corresponding recess therebetween that is preferably aligned with the fourth recess 26c when the second portion 12 of the housing is assembled with the first portion 11, as shown in FIG. 1. These cooperating recesses 26c are provided to support one or more printed circuit boards (not shown) within the housing for the linear actuator 10. To accomplish this, the edges of the printed circuit boards are sized to fit snugly within the cooperating recesses 26c when the first and second portions 11 and 12 of the housing are assembled. The printed circuit boards are conventional in the art and may, for example, include limit switches for generating electrical signals when the elongated tube 18 has been moved to predetermined maximum extended and retracted positions.

The cooperating recesses 26c are also provided to facilitate the attachment of an end cap 17 to close the end of the elongated tube portion 15 of the housing for the linear actuator 10, as shown in FIG. 1. The end cap 17 is a generally cup-shaped member having an internal size that corresponds with, but is slightly smaller than, the end of the elongated tube portion 15 of the housing for the linear actuator 10. Thus, the end cap 17 can be press fit over the end of the elongated tube portion 15. The end cap 17 has a pair of apertures 17a (one of which is illustrated in FIG. 1) formed therethrough. The apertures 17a are located so as to be axially aligned with the ends of the cooperating recesses 26c formed in the first and second portions 11 and 12 of the housing for the linear actuator 10. Threaded fasteners 17b extend through the apertures 17a and into threaded engagement with the opposed pair of internal walls 26a and 26b formed in the first and second portions 11 and 12 of the housing to positively retain the end cap 17 on the elongated tube portion 15.

Figure 7:
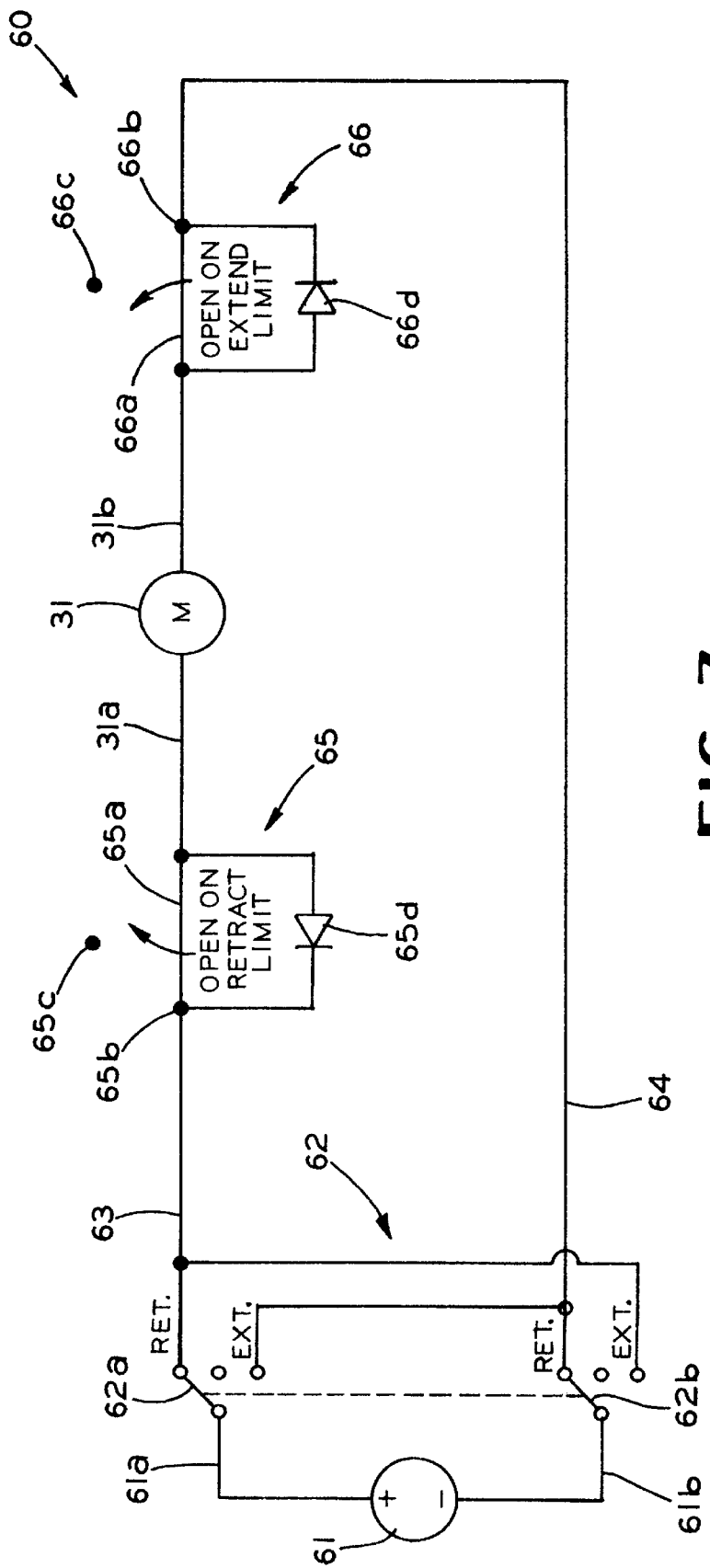
FIG. 7 is a schematic diagram of an electrical control circuit in accordance with this invention for operating the electric motor illustrated in FIGS. 3 and 4.

Referring now to FIG. 7, there is illustrated a schematic diagram of a prior art electrical control circuit, indicated generally at 60, for controlling the operation of the electric motor 31. The prior art control circuit 60 includes a source of electrical energy 61 having a pair of leads 61a and 61b that are connected to a conventional double pole, double throw switch, indicated generally at 62, having a center-off position. As shown in FIG. 7, movable elements 62a and 62b of the switch assembly 62 can be oriented in respective first positions, wherein the positive terminal of the source of electrical energy 61 is connected to a first lead 63 and the negative terminal of the source of electrical energy 61 is connected to a second lead 64. For the purposes of illustration, it will be assumed that the movable elements 62a and 62b of the switch assembly 62 are to be moved to these first positions whenever it is desired to retract the nut 51 and the extension tube 18 toward the rear of the linear actuator 10.

The movable elements 62a and 62b of the switch assembly 62 can also be moved to respective second positions, wherein the positive terminal of the source of electrical energy 61 is connected to the second lead 64 and the negative terminal of the source of electrical energy 61 is connected to the first lead 63. For the purposes of illustration, it will be assumed that the movable elements 62a and 62b of the switch assembly 62 are to be moved to these second positions whenever it is desired to extend the nut 51 and the extension tube 18 toward the front of the linear actuator 10. Also, it will be appreciated that the movable elements 62a and 62b of the switch assembly 62 can be moved to intermediate positions, wherein both the positive and negative terminals of the source of electrical energy 61 are disconnected from the first and second leads 63 and 64. The movable elements 62a and 62b of the switch assembly 62 are to be moved to these intermediate positions whenever it is desired to disable the motor 31 from moving the nut 51 and the extension tube 18 in either direction.

The first lead 63 is connected to a first limit switch, indicated generally at 65. The first limit switch 65 is a single pole, double throw switch including a movable pole element 65a that can be selectively connected to either a first contact 65b or a second contact 65c. The first contact 65b of the first limit switch 65 is connected to the first lead 63 from the source of electrical power 61. A diode 65d is connected in parallel across the first limit switch 65. The anode of the diode 65d is connected to the movable pole element 65a of the first limit switch 65, while the cathode of the diode 65d is connected to the first contact 65b thereof. The movable pole element 65a of the first limit switch 65 is connected to a first lead 31a of the electric motor 31. A second lead 31b of the electric motor 31 is connected to a second limit switch, indicated generally at 66. The second limit switch 66 is also a single pole, double throw switch including a movable pole element 66a that can be selectively connected to either a first contact 66b or a second contact 66c. The first contact 66b of the second limit switch 66 is connected to the second lead 64. A diode 66d is connected in parallel across the second limit switch 66. The anode of the diode 66d is connected to the movable pole element 66a of the second limit switch 66, while the cathode of the diode 66d is connected to the first contact 66b thereof. In the illustrated embodiment, the first limit switch 65 is opened when the nut 51 is moved to a predetermined maximum retracted position, while the second limit switch 66 is opened when the nut 51 is moved to a maximum extended position.

Assuming that the nut 51 is located in an intermediate position and that it is desired to retract the nut 51 toward the rear of the linear actuator 10, the movable elements 62a and 62b of the switch assembly 62 are moved to the first positions illustrated in FIG. 7. As a result, electrical current flows in a closed operating circuit from the positive terminal of the source of electrical energy 61 through the lead 61a, the movable element 62a, the lead 63, the movable pole element 65a of the first limit switch 65, the motor 31, the movable pole element 66a of the second limit switch 66, the lead 64, the movable element 62b, and the lead 61b to the negative terminal of the source of electrical energy 61. Consequently, the motor 11 is operated to rotate the output shaft 12 in such a direction as to retract the nut 51 linearly from right to left when viewing FIG. 4. When the nut 51 is moved to a predetermined maximum retracted position, the movable pole element 65a of the first limit switch 65 is moved from the first contact 65b to the second contact 65c. As a result, the closed operating circuit is interrupted, and the motor 31 coasts to a stop. The diode 65d is provided to allow a closed operating circuit to be established when it is desired to extend the nut 51 after the movable pole element 65a of the first limit switch 65 has been moved from the first contact 65b to the second contact 65c.

On the other hand, if it desired to extend the nut 51 toward the front of the linear actuator 10, the movable elements 62a and 62b of the switch assembly are moved to the second positions discussed above. As a result, electrical current flows in a closed operating circuit from the positive terminal of the source of electrical energy 61 through the lead 61a, the movable element 62a, the lead 64, the movable pole element 66a of the second limit switch 66, the motor 31, the movable pole element 65a of the first limit switch 65, the lead 63, the movable element 62b, and the lead 61b to the negative terminal of the source of electrical energy 61. Consequently, the motor 31 is operated to rotate the output shaft 12 in such a direction as to extend the nut 51 linearly from left to right when viewing FIG. 4. When the nut 51 is moved to a predetermined maximum extended position, the movable pole element 66a of the second limit switch 66 is moved from the first contact 66b to the contact pole 66c. As a result, the closed operating circuit is interrupted, and the motor 31 again coasts to a stop. The diode 66d is provided to allow a closed operating circuit to be established when it is desired to retract the nut 51 after the movable pole element 66a of the second limit switch 66 has been moved from the first contact 66b to the second contact 66c.

Figure 8:
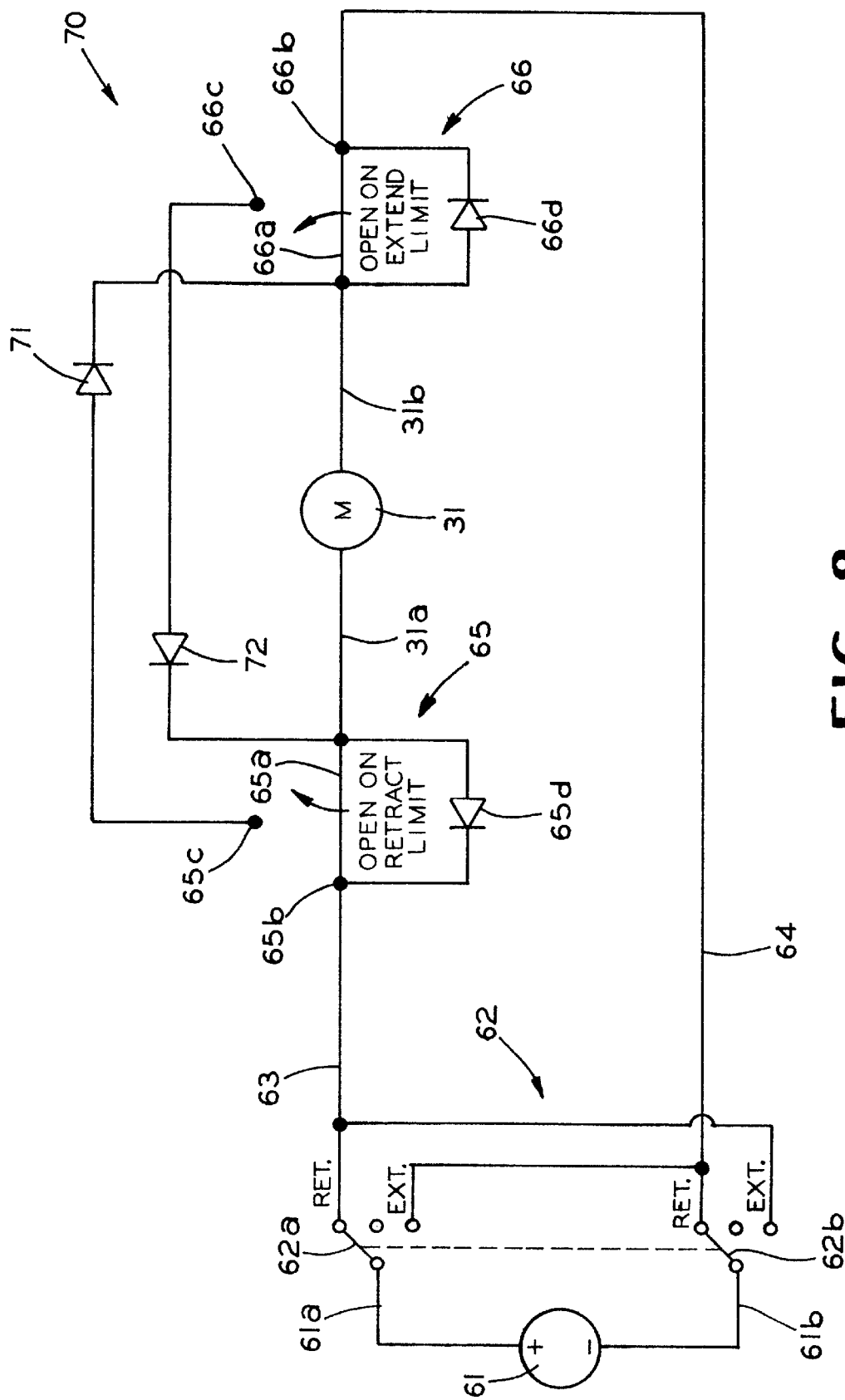
FIG. 8 is a schematic diagram of a prior art electrical control circuit for operating the electric motor illustrated in FIGS. 3 and 4.

As mentioned above, when the nut 51 reaches either of the maximum retracted and extended positions, the closed operating circuit is interrupted. As a result, the motor 31 coasts to a stop. The amount of additional movement of the nut 51 after the closed operating circuit has been interrupted is relatively small. However, in order to minimize the physical size of the linear actuator 10, it would be desirable that the electric motor 31 cease any further rotation as soon as possible after the nut 51 reaches either of the maximum retracted and extended positions. FIG. 8 is a schematic diagram of an improved electrical control circuit, indicated generally at 70, for controlling the operation of the electric motor 31 that includes a dynamic braking circuit for accomplishing this. The control circuit 70 of this invention is, in large measure, identical to the prior art control circuit 60 described above, and like reference numbers are used to indicate corresponding components. The control circuit 70 further includes a pair of diodes 71 and 72 that are connected between the first and second limit switches 65 and 66. The anode of the diode 71 is connected to the second contact 65c of the first switch 65, while the cathode of the diode 71 is connected to the movable pole element 66a of the second switch 66. Conversely, the anode of the diode 72 is connected to the second contact 66c of the second switch 66, while the cathode of the diode 72 is connected to the movable pole element 65a of the first switch 65.

The diodes 71 and 72 permit dynamic braking to occur when the nut 51 has been moved to either of the maximum retracted and extended positions, thereby causing the electric motor 31 to stop moving more quickly. Specifically, when the nut 51 has been moved to the predetermined maximum extended position, the movable pole element 66a of the second limit switch 66 is moved from the first contact 66b to the second contact 66c. As a result, the above-described closed operating circuit is interrupted, and the motor 31, having been disconnected from the source of electrical energy 61, will coast to a halt by virtue of its rotational inertia. At the same time, the second lead 31b of the electric motor 31 is connected through the diode 72 to the first lead 31a thereof. It is known that while the motor 31 is coasting to a halt, it functions as a generator and, therefore, produces an electrical voltage. Because the second lead 31b of the electric motor 31 is connected through the diode 72 to the first lead 31a, a low impedance path is provided to quickly dissipate this energy from the motor 31, thereby decreasing the amount of coasting of the motor 31. The diode 72 is provided in this low impedance path to prevent electrical current from flowing therethrough in the opposite direction when the motor 31 is operated in the reverse direction. A similar result occurs when the nut 51 has been moved to the predetermined maximum retracted position by virtue of the diode 71.

Figure 9:
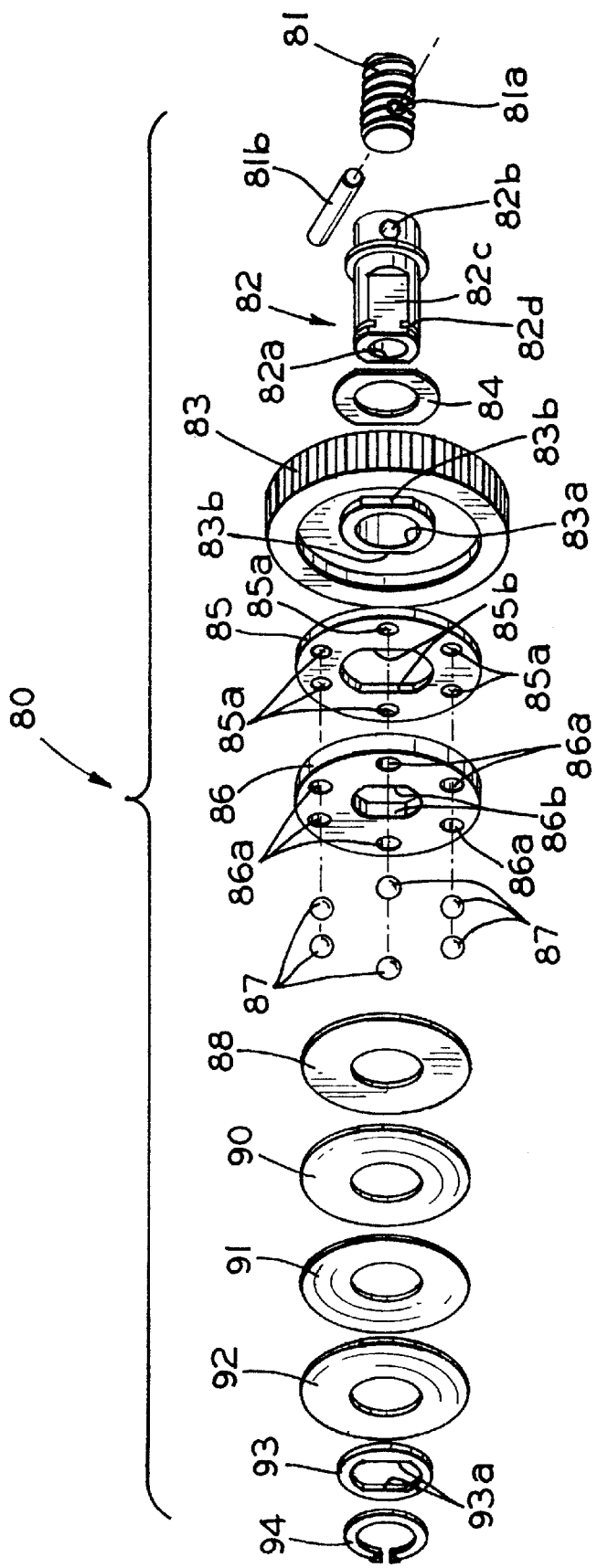
FIG. 9 is an enlarged exploded perspective view of a portion of a prior art screw assembly.

Referring now to FIG. 9, there is illustrated an exploded perspective view of a portion of a prior art screw assembly, indicated generally at 80. As shown therein, the prior art screw assembly 80 includes an elongated threaded screw 81 having a transverse aperture 81a formed therethrough. The prior art screw assembly 80 also includes a generally hollow cylindrical hub, indicated generally at 82, having a central opening 82a formed therethrough that is sized to receive an end of the screw 81 therein. The hub 82 has a pair of transverse openings 82b (only one is illustrated) formed therethrough that can be aligned with the transverse aperture 81a formed through the end of the screw 81.

The hub 82 is connected to the screw 81 for rotation therewith by disposing the end of the screw 81 within the central opening 82a formed through the hub 82 and inserting a pin 81b through the transverse aperture 81a formed through the screw 81 and the aligned transverse openings 82b of the hub 82. The length of the pin 81b is selected to be somewhat larger than the diameter of the screw 81. As a result, the ends of the pin 41c extend outwardly on opposite sides of the screw 81 and the hub 82 when assembled. The hub 82 also has a pair of opposed flats 82c (only one is illustrated) formed thereon for a purpose that will be described below. Also, an annular groove 82d is formed on the hub 82 for a purpose that will be described below.

A toothed gear 83 is formed having an enlarged central hub portion having a circular central opening 83a formed therethrough and a pair of opposed flats 83b formed thereon. The central opening 83a of the toothed gear 83 is sized to receive the hub 82 therethrough for relative rotation. If desired, a washer 84 may be provided between the hub 82 and the toothed gear 83. A first clutch plate 85 is disposed adjacent to the toothed gear 83. The first clutch plate 85 has a plurality of recesses 85a formed therein and a central opening formed therethrough. The recesses 85a are generally semi-spherical in shape and are provided for a purpose that will be explained below. The central opening is formed having a pair of opposed flats 85b that are sized to cooperate with the flats 83c formed on the toothed gear 83. Thus, the first clutch plate 85 is connected to the toothed gear 83 for rotation therewith.

A second clutch plate 86 is disposed adjacent to the first clutch plate 85. The second clutch plate 86 has a plurality of peripheral apertures 86a formed therethrough and a central opening formed therethrough. The peripheral apertures 86a are aligned with the semi-spherical recesses 85b formed in the first clutch plate 85 and are provided for a purpose that will be explained below. The central opening is formed having a pair of opposed flats 86b that are sized to cooperate with the flats 82c formed on the hub 82. Thus, the second clutch plate 86 is also connected to the hub 82 (and, therefore, the screw 81) for rotation therewith. A ball bearing 87 is provided for and disposed within each of the peripheral apertures 86a. The ball bearings 87 are sized to e slightly smaller than the inner diameters of the peripheral apertures 86a to allow for free axial movement therein, while limiting the amount of radial play therebetween. The ball bearings 87 are further sized to be larger in diameter than the thickness of the second clutch plate 86 for a purpose that will be explained below.

A flat retaining washer 88 is disposed adjacent to the second clutch plate 86. The retaining washer 88 is provided to retain the ball bearings 87 within the peripheral apertures 87a formed through the second clutch plate 87. A plurality of Belleville springs 90, 91, and 92 are disposed adjacent to the retaining washer 88 in reverse end-to-end fashion. The retaining washer 88 and the Belleville springs 90, 91, and 92 each have central openings formed therethrough that are sized to receive the end of the hub 82 therein. A shim 93 is disposed adjacent to the Belleville springs 90, 91, and 92. The shim 93 has a central opening formed therethrough having a pair of flats 93a formed thereon. The flats 93a are sized to cooperate with the flats 82c formed on the hub 82. Thus, the shim 93 is connected to the hub 82 for rotation therewith. Lastly, a retaining ring 94 is disposed adjacent to the shim 93. The retaining ring 94 is sized to be received within the annular groove 82d formed on the hub 82 to retain all of the above-described components on the hub 82.

The Belleville springs 90, 91, and 92 urge the flat washer 88 against the second clutch plate 86. As a result, the ball bearings 87 are urged into the recesses 85a formed in the face of the first clutch plate 85. The ball bearings 87 are sized such that first semi-spherical portions thereof are received within such recesses 85a, while second semi-spherical portions thereof remain within the peripheral apertures 86a of the second clutch plate 86. Thus, the first and second clutch plates 85 and 86 are normally connected together for joint rotation. As a result, rotation of the toothed gear 83 causes corresponding rotation of the first and second clutch plates 85 and 86, the hub 82, and the screw 81. However, the amount of torque that can be transmitted from the toothed gear 83 to the hub 82 is limited by the thickness of the shim 93, which controls the amount of force generated by the Belleville springs 90, 91, and 92 against the washer 88 and, therefore, the ball bearings 87 and the recesses 85a.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A linear actuator comprising:
   a motor including a rotatable output shaft;
   a screw assembly including a linearly movable extension tube, said screw assembly being connected to said output shaft of said motor such that rotation of said output shaft causes linear movement of said extension tube; and
   a housing including a first portion and a second portion, said first portion receiving and supporting said motor and said screw assembly therein, said second portion of said housing being connected to said first portion so as to form a protective enclosure for said motor and said screw assembly and for retaining said motor and said screw assembly in said first portion of said housing.

2. The linear actuator defined in claim 1 wherein said first portion of said housing includes a first pair of opposed internal walls that define a first recess therebetween, a first portion of said motor being received and Supported within said first recess.

3. The linear actuator defined in claim 2 wherein said first portion of said motor includes a first vibration isolating damper that is received and supported within said first recess.

4. The linear actuator defined in claim 2 wherein said first portion of said housing further includes a second pair of opposed internal walls that define a second recess therebetween, a second portion of said motor being received and supported within said second recess.

5. The linear actuator defined in claim 4 wherein said first portion of said motor includes a first vibration isolating damper that is received and supported within said first recess, and wherein said second portion of said motor includes a second vibration isolating damper that is received and supported within said second recess.

6. The linear actuator defined in claim 4 wherein said first portion of said housing further includes a third pair of opposed internal walls that define a third recess therebetween, a third portion of said motor being received and supported within said third recess.

7. The linear actuator defined in claim 6 wherein said first portion of said motor includes a first vibration isolating damper that is received and supported within said first recess, said second portion of said motor includes a second vibration isolating damper that is received and supported within said second recess, and said third portion of said motor includes a third vibration isolating damper that is received and supported within said third recess.

8. The linear actuator defined in claim 1 wherein said first portion of said housing includes a pair of opposed internal walls that define a recess therebetween, a portion of said screw assembly being received and supported within said recess.

9. A linear actuator comprising:
   a motor including a rotatable output shaft having an output gear mounted thereon;
   a screw assembly including a screw gear that cooperates with said output gear for rotation therewith, a rotatable screw, a load limiting clutch assembly connected between said screw gear and said screw, and a nut cooperating with said screw such that rotation of said screw causes linear movement of said nut, said load limiting clutch assembly including a hub connected to said screw for rotation therewith and having a recess formed therein, an aperture formed in said screw gear, and a ball disposed at least partially within said aperture and urged into engagement with said recess by a spring.

10. The linear actuator defined in claim 9 wherein said hub is connected to said screw by a pin that extends through an aperture formed through the screw, said pin having an end that protrudes from said aperture and that is received within a recess formed in said hub.

11. The linear actuator defined in claim 9 wherein said hub has a plurality of recesses formed therein, a plurality of apertures are formed in said screw gear, and a balls is disposed at least partially within each of said plurality of apertures, said balls being urged into respective engagement with said recesses by respective springs.

12. The linear actuator defined in claim 9 further including a retainer plate that is maintained against said screw gear to retain said spring and said ball within said apertures formed through said screw gear.

13. The linear actuator defined in claim 12 wherein said retainer plate is mounted on a portion of said hub and is connected to said screw gear for rotation therewith relative to said hub.

14. A linear actuator comprising:
- a motor including a rotatable output shaft having an output gear mounted thereon;
- a screw assembly including a screw that is rotatably driven by said output gear, a nut cooperating with said screw such that rotation of said screw causes linear movement of said nut, and an extension tube connected to said nut for linear movement therewith, said nut including a mounting hub having a plurality of flats and a generally annular reduced diameter recess formed thereon, portions of said extension tube extending into engagement with said flats and said recess to prevent both relative rotational and axial movement between said nut and said extension tube.

15. The linear actuator defined in claim 14 wherein said nut has a threaded central aperture formed therethrough that cooperates with a threaded outer surface of said screw.

16. The linear actuator defined in claim 14 wherein said nut includes an anti-rotation arm that is received within a recess defined between internal walls formed in a housing for said linear actuator to restrain said nut from rotation relative said housing when said screw is rotated by said motor.

* * * * *